United States Patent [19]

Mendoza

[11] Patent Number: 4,606,924

[45] Date of Patent: Aug. 19, 1986

[54] METHOD FOR PREPARING FOOD PRODUCT

[76] Inventor: Fausto C. Mendoza, Calzada San Esteban Num. 57, Naucalpan de Jaurez, Estado de Mexico, Mexico

[21] Appl. No.: 680,744

[22] Filed: Dec. 12, 1984

[30] Foreign Application Priority Data

Dec. 16, 1983 [MX] Mexico ................................ 10944

[51] Int. Cl.$^4$ ............................................. A21D 10/00
[52] U.S. Cl. ..................................... 426/549; 426/446
[58] Field of Search ............... 426/549, 602, 446, 465, 426/520, 523

[56] References Cited

U.S. PATENT DOCUMENTS 1,553,294 9/1925 Baker ................................ 426/602
2,508,393 5/1950 Jaeger ............................... 426/602

FOREIGN PATENT DOCUMENTS 2918167 11/1980 Fed. Rep. of Germany ...... 426/549
0063906 5/1977 Japan .

*Primary Examiner*—Raymond N. Jones
*Assistant Examiner*—Elizabeth A. King
*Attorney, Agent, or Firm*—Albert L. Jeffers; Anthony Niewyk

[57] ABSTRACT

A farinaceous dough compositon comprises an emulsion of water and fat having water as its continuous phase and a dispersed phase comprising small globules of fat, and flour. A method of making a bakeable dough composition comprising the steps of mixing fat and water to form an emulsion wherein the emulsion has the water as its continuous phase and a dispersed phase comprises small globules of the fat. The second step comprising kneading the emulsion and flour wherein the flour is present in an amount sufficient to form a farinaceous dough upon thorough kneading of the emulsion and flour.

9 Claims, No Drawings

METHOD FOR PREPARING FOOD PRODUCT

BACKGROUND OF THE INVENTION

The invention relates to a food product and a method for making the same. More specifically, the invention relates to a farinaceous dough composition and the method for making said farinaceous dough composition.

Many foods are prepared through a frying process. In this process, the unfried food is submersed into a kettle, vat, pan or the like which contains heated fat in a liquid phase. Typically, the fat has not been heated to a temperature where it begins to smoke or, in other words, is not at its smoking point.

It is typical in a frying process that the uncooked food product is in the form of a raw dough. This dough generally contains water.

When the uncooked food product is submersed into the liquid fat, the water contained therein is transformed into steam since the temperature of the liquid fat is greater than the boiling point of water. As the steam exits the food, there is created an empty space or pore in the food. This pore or void is typically filled with the liquid fat in which the food product is being fried. When the food product is removed from the liquid fat, the fat remains in the now cooked food product.

As can be appreciated, this result is undesirable when the amount of fat contained within the cooked food product is excessive. The presence of excessive fat in the cooked food product can easily lead to an undesirable fatty or greasy taste to the food. Further, the presence of excessive fat in the cooked food results in an undesirably high amount of calories in the food.

In view of the presence of excessive fat, in the past there has not been a desire to subject the uncooked dough to a temperature high enough to cause a violent and quick transformation of the water into steam. This would result in a larger pore in the food product which would result in a higher than desired fat content. However, larger pores in the food product would make it more fragile and more easily edible.

While chefs or cooks possess greater or lesser degrees of expertise in frying foods than others, it is well-accepted that the skillful frying of foods is very difficult. At times, even a chef of the most skill cannot achieve the optimum result with a fried food product.

It would thus be desirable to provide a food product, as well as a method of producing the food product, wherein the fat content is below an undesirably high level. This would result in a food product with an improved taste as well as a reduced calorie content.

Furthermore, it would be desirable if the improved food product and method for making same is such so that the a finished food product has a consistent taste as well as a consistently low calorie content without the need to utilize a person having extraordinarily good cooking skills in the preparation of the food product.

It would also be desirable to provide a food product, and method for making the same, wherein the cooked food product has larger pores so as to be fragile and easily edible and yet does not have a prohibitively high fat content.

SUMMARY OF THE INVENTION

It is therefore an object of the invention to provide an improved food product and method for making the same.

Further, it is another object of the invention to provide an improved food product and method for making the same wherein the amount of fat contained in the finished food product does not undesirably affect the taste of the food.

Further, it is another object of the invention to provide an improved food product and method for making the same wherein the amount of fat contained in the food product is not excessively high so as to give the food product an excessively high calorie content.

It is another object of the invention to provide an improved food product and method for making the same wherein the cooked food product has larger pores and does not have a prohibitively high fat content.

Finally, it is an object of the invention to provide an improved food product and method for making the same wherein the amount of fat contained in the finished food product can be maintained at a consistent level without utilizing unusual or extraordinary cooking expertise.

In one form thereof, the invention is a farinaceous dough composition comprising an emulsion of water and fat. The emulsion has the water at its continuous phase and the dispersed phase thereof comprises small globules of fat. The dough composition further includes flour.

In other form thereof, the invention is a method for making a bakeable dough composition comprising the steps of mixing fat and water to form an emulsion. Then kneading the emulsion and flour wherein the flour is in an amount sufficient to form a farinaceous dough upon thorough kneading of the emulsion and flour.

Finally, in another form thereof, the invention is a method for making a cooked food product comprising the steps of mixing fat and water to form an emulsion wherein the emulsion has the water as its continuous phase and the fat as its dispersed phase. Then thoroughly mixing the emulsion with about an equal by weight amount of flour until the emulsion and flour are thoroughly mixed to form a dough. Initially baking the dough at a first temperature for a first duration so that the water in the dough evaporates quickly to form pores in the dough. Subsequently, baking the initially baked dough at a second temperature for a second duration to completely cook the food product.

DETAILED DESCRIPTION

It takes a certain amount of expertise to consistently fry (e.g. deep fat frying) food without from time to time producing a food product that has excessive fat absorption. Excessive fat absorption results in a food product having an undesirably increased calorie count as well as, in some cases, a fatty and undesirable taste. These characteristics are generally undesirable in fried food products.

It is also the case that fat absorption in fried foods increases with the length of the frying or cooking time and increases with the amount of surface that is exposed to the fat during frying. As can be appreciated in the case of a food product that has a great amount of exposed surface area, such as a tortilla or the like, excessive fat absorption can constitute a meaningful problem. Further, in a fast food operation which serves fried foods, for example, a Mexican fast food restaurant, the care with which restaurant personnel fry foods can vary. During periods of high restaurant usage, personnel may be busy at the counter or at other tasks so that the food product being cooked by frying may be overfired resulting in an excessive amount of absorbed fat. In order to avoid the above-described problems associated with excessive fat absorption during frying, the applicant herein has invented an improved food product and method of making the same.

Sometimes with fried foods the completely cooked food product, such as a tortilla shell, is not particularly fragile or easily edible. This is sometimes due to the presence of smaller pores in the food product. The pores are formed when water evaporates into steam and exits the dough. In a conventional frying operation, smaller pores do not absorb as much fat, and hence, have been more desirable from a fat absorption viewpoint than larger pores. Although a food product with larger pores is more fragile and easily edible, such a food product would absorb more fat than would be acceptable. In order to provide a food product with larger pores and an acceptable fat content, the applicant herein has invented an improved food product and method of making the same.

By applicant's invention, the amount of fat contained within the food product will not exceed that amount initially contained in the uncooked shaped flour product. This is accomplished by first mixing a preselected amount of water with a preselected amount of fat so as to form an emulsion. The water is the continuous phase of the emulsion and the fat is contained in dispersed globules throughout the emulsion. In other words, the fat is the dispersed phase.

A preselected amount of emulsion is then thoroughly mixed or kneaded with a preselected amount of flour to result in a farinaceous dough mixture. As can be appreciated, the relative amounts of emulsion and flour can vary depending upon the type of fat and type of flours that are utilized. The dough, after being thoroughly kneaded, is then formed into the desired product shape. As can be appreciated, one batch of dough can be made into a plurality of shaped food products.

The shaped dough product is then placed inside an oven and baked pursuant to an appropriate baking or cooking process. In regard to the process, there are two basic steps or stages. In the initial stage, the uncooked dough is cooked at a relatively high temperature so that water within the product quickly or violently evaporates so as to open pores in the product. These pores are larger-sized pores due to the quick evaporation of water. Of course, it is best if the temperature is not so high as to cause the fat contained within the dough to reach its smoking point. The duration of the initial step is short compared to the duration of the second step.

In the second step, the food product is cooked at a lower temperature than the first temperature and for a longer duration than the first duration. During the second step, the food is fried by the fat that remains in the food product. The result is a cooked as by frying food product which has a fat content of no more than a preselected amount of fat therein. As can be appreciated, since the dough food product is baked and not fried, the maximum amount of fat content would be that originally contained in the emulsion kneaded with the flour to form the dough. It should be appreciated that the food product also has larger pores resulting in a more fragile and easily edible food product.

EXAMPLE

A specific example of applicant's invention is set out below:

100 grams of fat are thoroughly mixed with 900 grams of water until one liter of emulsion is obtained. The emulsion is then thoroughly mixed or kneaded with a kilogram of corn flour to result in two kilogrms of a farinaceous dough. This dough is then formed into a plurality of tortilla shells. The tortilla shells are then placed inside an oven and baked.

The temperature and duration of baking is as follows: (1) the tortilla shells were first baked at a temperature between 500° C. and 600° C. for a duration between 40 seconds and 60 seconds; and (2) the tortilla shells were next baked at a temperature of between 160° C. and 200° C. for a duration of two minutes. The result was a cooked tortilla shell.

By submitting the dough composition to the elevated temperature during the initial baking step, the water contained within the tortilla shells quickly evaporates and is lost. Further, the water evaporation is sudden so as to open the pores in the food product. This results in a food product that, when completely baked, is fragile and easy to eat.

The fat contained in the tortilla shells is sufficiently hot so as to cook the dough so that the result is a completely cooked tortilla shell. The tortilla shell does not have a fat content higher than that of the original uncooked dough, yet, as previously mentioned, the fully cooked tortilla (food product) has larger pores so as to be fragile and easily edible.

As can be appreciated from the above example, the amounts of water, fat, and flour can vary, depending upon the types fat and flour used. A typical kind of fat utilized could be a shortening such as lard or the hydrogenated fats. A typical kind of flour could be various grades of wheat flour, corn flour, or soybean flour. Further, it is contemplated by applicant's invention that a liquid oil can be used rather than a fat, wherein the oil could comprise corn oil, cottonseed oil, safflower oil, soy bean oil, or peanut oil. Again, it depends upon the particular food product being produced and the particular taste and consistency thereof that is desired.

While there have been described above the principles of this invention in connection with specific Examples it will be clearly understood that this description is made only by way of example and not as a limitation as to the scope of the invention.

What is claimed is:

1. A method of making a cooked food product comprising the steps of:
    mixing fat and water to form an emulsion wherein the emulsion has the water as its continuous phase and the fat as its dispersed phase;
    thoroughly mixing the emulsion with about an equal weight amount of flour until the emulsion and flour are thoroughly mixed to form a dough;
    initially baking said dough at a first temperature for a first duration sufficient to evaporate the water in said dough whereby pores are formed in the dough; and
    subsequently baking said initially baked dough at a second temperature lower than said first temperature for a second duration longer than said first duration to completely cook the food product.

2. The method of claim 1 wherein said fat comprises from five to ten percent by weight of the emulsion.

3. The method of claim 1 wherein said water comprises from ninety to ninety-five percent by weight of the emulsion.

4. The method of claim 1 wherein said emulsion comprises from forty-five to fity-five percent by weight of the dough.

5. The method of claim 1 wherein said flour comprises from forty-five to fifty-five percent by weight of the dough.

6. The method of claim 1 further including the step of forming the dough into a shaped food product prior to baking the dough.

7. The method of claim 1 wherein the second temperature is in the range between 160° C. and 200° C., and the second duration is about 2 minutes.

8. The method of claim 1 wherein during the subsequent baking step the fat in the dough does not exceed the fat contained in the initial dough.

9. A method of making a cooked food product comprising the steps of:
  mixing fat and water to form an emulsion wherein the emulsion has the water as its continuous phase and the fat as its dispersed phase;
  thoroughly mixing the emulsion with about an equal weight amount of flour until the emulsion and flour are thoroughly mixed to form a dough;
  initially baking said dough at a temperature between 500° C. and 600° C. and for a first duration between 40 seconds and 60 seconds whereby pores are formed in the dough; and
  subsequently baking said initially baked dough at a second temperature lower than said first temperature for a second duration to completely cook the food product.

* * * * *